(12) United States Patent
Ionescu

(10) Patent No.: US 7,707,142 B1
(45) Date of Patent: Apr. 27, 2010

(54) METHODS AND SYSTEMS FOR PERFORMING AN OFFLINE SEARCH

(75) Inventor: Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 979 days.

(21) Appl. No.: 10/814,069

(22) Filed: Mar. 31, 2004

(51) Int. Cl.
G06F 17/30 (2006.01)
(52) U.S. Cl. .............................................. 707/3; 707/7
(58) Field of Classification Search ................. 345/811; 707/200, 3, 7; 704/3, 7
See application file for complete search history.

(56) References Cited

U.S. PATENT DOCUMENTS

| | | | |
|---|---|---|---|
| 5,418,948 A | 5/1995 | Turtle | |
| 5,678,038 A | 10/1997 | Dockter et al. | |
| 5,696,962 A | 12/1997 | Kupiec | |
| 5,701,469 A | 12/1997 | Brandli et al. | |
| 5,717,913 A | 2/1998 | Driscoll | |
| 5,754,938 A | 5/1998 | Herz et al. | |
| 5,826,261 A | 10/1998 | Spencer | |
| 5,890,152 A | 3/1999 | Rapaport et al. | |
| 5,911,139 A | 6/1999 | Jain et al. | |
| 5,933,827 A | 8/1999 | Cole et al. | |
| 5,940,821 A | 8/1999 | Wical | |
| 5,964,839 A | 10/1999 | Johnson et al. | |
| 5,987,446 A | 11/1999 | Corey et al. | |
| 6,006,222 A | 12/1999 | Culliss | |
| 6,012,067 A | 1/2000 | Sarkar | |
| 6,014,665 A | 1/2000 | Culliss | |
| 6,070,158 A | 5/2000 | Kirsch et al. | |
| RE36,727 E | 6/2000 | Kageneck et al. | |
| 6,078,916 A | 6/2000 | Culliss | |
| 6,112,203 A | 8/2000 | Bharat et al. | |
| 6,122,647 A | 9/2000 | Horowitz et al. | |
| 6,167,434 A | 12/2000 | Pand | |
| 6,182,068 B1 | 1/2001 | Culliss | |
| 6,199,059 B1 | 3/2001 | Dahan et al. | |
| 6,272,507 B1 | 8/2001 | Pirolli et al. | |
| 6,321,228 B1 | 11/2001 | Crandall et al. | |
| 6,397,221 B1 | 5/2002 | Greef et al. | |
| 6,421,675 B1 | 7/2002 | Ryan et al. | |
| 6,460,036 B1 | 10/2002 | Herz | |
| 6,490,575 B1 | 12/2002 | Berstis | |
| 6,505,191 B1 | 1/2003 | Baclawski | |

(Continued)

OTHER PUBLICATIONS

Chen, et al., "Bringing order to the Web: automatically categorizing search results", Proceedings of the SIGCHI conference on Human factors in computing systems, Apr. 2000, p. 145-152. Retrieved from the Internet:<URL: http://portal.acm.org/ft_gateway.cfm?id=332418&type=pdf&coll=GUIDE&dl=GUIDE&CFID=49352357&CFTOKEN=43112086>.*

(Continued)

Primary Examiner—Jean B. Fleurantin
Assistant Examiner—Dennis Myint
(74) Attorney, Agent, or Firm—Fenwick & Westl LLP

(57) ABSTRACT

Methods and systems that perform an offline search for an article are described. In one aspect of the invention, the aspect includes receiving a search query, determining whether the search query has been previously entered, if the search query has been previously entered, retrieving a previously stored result set, determining whether a previously stored result set meets at least one condition, and if the previously stored result set meets at least one condition, outputting the previously stored result set.

35 Claims, 4 Drawing Sheets

U.S. PATENT DOCUMENTS

| | | | |
|---|---|---|---|
| 6,546,388 B1 | 4/2003 | Edlund et al. | |
| 6,571,234 B1 | 5/2003 | Knight et al. | |
| 6,581,056 B1 | 6/2003 | Rao | |
| 6,583,798 B1 | 6/2003 | Hoek et al. | |
| 6,587,856 B1 | 7/2003 | Srinivasan et al. | |
| 6,602,300 B2 | 8/2003 | Ushioda et al. | |
| 6,633,868 B1 | 10/2003 | Min et al. | |
| 6,665,666 B1 | 12/2003 | Brown et al. | |
| 6,687,704 B1 | 2/2004 | Russell | |
| 6,697,799 B1 | 2/2004 | Neal et al. | |
| 6,697,840 B1 | 2/2004 | Godefroid et al. | |
| 6,745,178 B1 | 6/2004 | Emens et al. | |
| 6,766,320 B1 | 7/2004 | Wang et al. | |
| 6,772,188 B1 | 8/2004 | Cloutier | |
| 6,778,951 B1 | 8/2004 | Contractor | |
| 6,785,671 B1 | 8/2004 | Bailey et al. | |
| 6,795,825 B2 | 9/2004 | Rishe | |
| 6,803,906 B1 | 10/2004 | Morrison et al. | |
| 6,820,093 B2 | 11/2004 | de la Huerga | |
| 6,820,237 B1 | 11/2004 | Abu-Hakima et al. | |
| 6,834,287 B1 | 12/2004 | Fold-Williams et al. | |
| 6,850,934 B2 | 2/2005 | Bates et al. | |
| 6,853,998 B2 | 2/2005 | Biebesheimer et al. | |
| 6,874,126 B1 | 3/2005 | Lapidous | |
| 6,925,456 B2 | 8/2005 | Nakano et al. | |
| 6,948,134 B2 | 9/2005 | Gauthier et al. | |
| 6,950,791 B1 | 9/2005 | Bray et al. | |
| 6,961,910 B2 | 11/2005 | Lee et al. | |
| 6,961,954 B1 | 11/2005 | Maybury et al. | |
| 6,963,830 B1 | 11/2005 | Nakao | |
| 6,976,053 B1 | 12/2005 | Tripp et al. | |
| 6,976,090 B2 | 12/2005 | Ben-Shaul et al. | |
| 7,006,588 B2 * | 2/2006 | Simmons et al. | 375/368 |
| 7,007,085 B1 | 2/2006 | Malik | |
| 7,022,905 B1 | 4/2006 | Hinman et al. | |
| 7,027,975 B1 | 4/2006 | Pazandak et al. | |
| 7,032,174 B2 | 4/2006 | Montero et al. | |
| 7,043,492 B1 | 5/2006 | Neal et al. | |
| 7,054,860 B2 * | 5/2006 | Inaba et al. | 707/5 |
| 7,054,870 B2 | 5/2006 | Holbrook | |
| 7,082,428 B1 * | 7/2006 | Denny et al. | 707/5 |
| 7,099,860 B1 | 8/2006 | Liu et al. | |
| 7,146,399 B2 | 12/2006 | Fox et al. | |
| 7,162,473 B2 | 1/2007 | Dumais | |
| 7,171,352 B2 | 1/2007 | Chang et al. | |
| 7,181,459 B2 | 2/2007 | Grant et al. | |
| 7,194,455 B2 | 3/2007 | Zhou et al. | |
| 7,194,485 B2 | 3/2007 | Kaipa et al. | |
| 7,293,014 B2 | 11/2007 | Subramaniam et al. | |
| 7,293,015 B2 | 11/2007 | Zhou | |
| 7,305,129 B2 | 12/2007 | Chellapilla et al. | |
| 7,318,049 B2 | 1/2008 | Iannacci | |
| 7,412,708 B1 | 8/2008 | Khan et al. | |
| 7,421,645 B2 | 9/2008 | Reynar | |
| 7,437,353 B2 | 10/2008 | Marmarmos et al. | |
| 7,451,136 B2 | 11/2008 | Chua et al. | |
| 7,478,089 B2 | 1/2009 | Henkin et al. | |
| 2001/0037328 A1 | 11/2001 | Pustejovsky et al. | |
| 2002/0016786 A1 | 2/2002 | Pitkow et al. | |
| 2002/0040311 A1 | 4/2002 | Douglass et al. | |
| 2002/0059272 A1 | 5/2002 | Porter | |
| 2002/0065800 A1 * | 5/2002 | Morlitz | 707/1 |
| 2002/0095427 A1 | 7/2002 | Kaplan | |
| 2002/0099700 A1 | 7/2002 | Li | |
| 2002/0103698 A1 | 8/2002 | Cantrell | |
| 2002/0103737 A1 | 8/2002 | Briere | |
| 2002/0103806 A1 * | 8/2002 | Yamanoue | 707/100 |
| 2002/0116291 A1 | 8/2002 | Grasso et al. | |
| 2002/0120456 A1 * | 8/2002 | Berg et al. | 704/278 |
| 2002/0129059 A1 | 9/2002 | Eck | |
| 2002/0174101 A1 | 11/2002 | Fernley et al. | |
| 2003/0014398 A1 | 1/2003 | Ohta | |
| 2003/0020749 A1 | 1/2003 | Abu-Hakima et al. | |
| 2003/0033296 A1 | 2/2003 | Rothmuller et al. | |
| 2003/0046311 A1 * | 3/2003 | Baidya et al. | 707/200 |
| 2003/0055831 A1 | 3/2003 | Ryan et al. | |
| 2003/0069877 A1 | 4/2003 | Grefenstette et al. | |
| 2003/0079185 A1 | 4/2003 | Katariya et al. | |
| 2003/0093276 A1 | 5/2003 | Miller et al. | |
| 2003/0093790 A1 | 5/2003 | Logan et al. | |
| 2003/0115552 A1 | 6/2003 | Jahnke et al. | |
| 2003/0123443 A1 | 7/2003 | Anwar | |
| 2003/0130982 A1 | 7/2003 | Kasriel et al. | |
| 2003/0135490 A1 | 7/2003 | Barrett et al. | |
| 2003/0135499 A1 | 7/2003 | Schirmer et al. | |
| 2003/0154071 A1 | 8/2003 | Shreve | |
| 2003/0158855 A1 | 8/2003 | Farnham et al. | |
| 2003/0167266 A1 | 9/2003 | Saldanha et al. | |
| 2003/0220912 A1 * | 11/2003 | Fain et al. | 707/3 |
| 2003/0220913 A1 * | 11/2003 | Doganata et al. | 707/3 |
| 2004/0001104 A1 * | 1/2004 | Sommerer et al. | 345/811 |
| 2004/0003097 A1 | 1/2004 | Willis et al. | |
| 2004/0030741 A1 | 2/2004 | Wolton et al. | |
| 2004/0036716 A1 | 2/2004 | Jordahl | |
| 2004/0059564 A1 | 3/2004 | Zhou | |
| 2004/0064447 A1 | 4/2004 | Simske et al. | |
| 2004/0068486 A1 | 4/2004 | Chilovskii | |
| 2004/0073534 A1 | 4/2004 | Robson | |
| 2004/0122656 A1 | 6/2004 | Abir | |
| 2004/0133560 A1 | 7/2004 | Simske | |
| 2004/0139106 A1 * | 7/2004 | Bachman et al. | 707/104.1 |
| 2004/0143569 A1 | 7/2004 | Gross et al. | |
| 2004/0225667 A1 | 11/2004 | Hu et al. | |
| 2004/0267700 A1 | 12/2004 | Dumais et al. | |
| 2004/0267730 A1 | 12/2004 | Dumais et al. | |
| 2004/0267813 A1 * | 12/2004 | Rivers-Moore et al. | 707/104.1 |
| 2005/0065909 A1 | 3/2005 | Musgrove et al. | |
| 2005/0114306 A1 | 5/2005 | Shu et al. | |
| 2005/0125382 A1 | 6/2005 | Karnawat et al. | |
| 2005/0125390 A1 | 6/2005 | Hurst-Hiller et al. | |
| 2005/0198026 A1 | 9/2005 | Dehlinger et al. | |
| 2005/0222987 A1 | 10/2005 | Vadon | |
| 2005/0262073 A1 | 11/2005 | Reed | |
| 2006/0010150 A1 * | 1/2006 | Shaath et al. | 707/102 |
| 2006/0136405 A1 | 6/2006 | Ducatel et al. | |

OTHER PUBLICATIONS

Pasca, Marius, "Acquisition of categorized named entities for web search", Proceedings of the thirteenth ACM international conference on Information and knowledge management, Nov. 2004, p. 137-145. Retrieved from the Internet:<URL: ttp://portal.acm.org/ ft_gateway. cfm?id=1031194&type=pdf&coll=GUIDE&dl=GUIDE& CFID=49352998&CFTOKEN =66340472>.*

Berlin, J., et al., "Database Schema Matching Using Machine Learning with Feature Selection," CAISE 2002, LNCS 2348, pp. 452-466, http://www.springerlink.com/contant/73u6cpt0qek8rgh0/.

Brill, E., "A Simple Rule-Based Part of Speech Tagger," Department of Computer Science, University of Pennsylvania, 1992, pp. 1-5.

Claypool, M., et al., "Inferring User Interest," IEEE Internet Computing, 2001, pp. 1-17, vol. 5, No. 6, located at http://web.cs.wpi.edu/~ claypool/papers/iui/iui.pdf.

Czerwinski, M., et al., "Visualizing Implicit Queries for Information Management and Retrieval," ACM CHI '99, May 15-20, 1999, pp. 560-567.

Knezevic, P. et al., "The Architecture of the Obelix—an Improved Internet Search Engine," Proceedings of the 33rd Annual Hawaii International Conference on System Sciences (HICSS) Jan. 4-7, 2000, Maui, HI, USA, pp. 2145-2155.

Li, W., et al., "Semantic Integration in Heterogeneous Databases Using Neural Networks," Proceedings of the 20th International Conference on Very Large Data Bases, Sep. 12-15, 1994, pp. 1-12, Morgan Kaufmann Publishers, San Francisco, CA.

Li, W., et al., "Semint: a Tool for Identifying Attribute Correspondences in Heterogeneous Databases Using Neural Networks," Data Knowl. Eng., Apr. 2000, pp. 484, vol. 33, No. 1, http://dx.doi.org/10.1016/S0169-023X(99)00044-0.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

Phelps, A., "All You Can Seek," Special Services, Jul. 1999, vol. 7, Iss. 7, [online] [Retrieved on Oct. 16, 2006] Retrieved from the Internet: http://www.smartcomputing.com/editorial/article.asp?article=articles/archive/g0707/26g07/26g07.asp.

Scha, R., et al., "An Augmented Context Free Grammar for Discourse," Proceedings of the 12$^{th}$ Conference on Computational Linguistics—vol. 2, Computational Linguistics, Aug. 22-27, 1988, pp. 573-577, Morristown, NJ, http://dx.doi.org/10.3115/991719.991756.

International Search Report and Written Opinion, PCT/US2004/038562, Apr. 6, 2005, 12 pages.

Czerwinski, M., et al., "Visualizing Implicit Queries for Information Management and Retrieval," CHI 99, May 15-20, 1999, ACM, pp. 560-567.

Garofalakis, M., et al., "XTRACT: a System for Extracting Document Type Descriptors from XML Documents," SIGMOD, ACM, Jun. 2000, p. 165-176, vol. 29, No. 2.

Horvitz, E., et al., "The Lumiere project: Bayesian user modeling for inferring the goals and needs of software users", Proceedings of the Fourteenth Conference on Uncertainty, 1998, pp. 256-265, Morgan Kaufmann: San Francisco.

Joho, H., et al., "A Study of User Interaction with a Concept-Based Interactive Query Expansion Support Tool," Advances in Information Retrieval, a Study of User Interaction, Lecture Notes in Computer Science, Mar. 2, 2004, pp. 42-56, vol. 2997.

Jones, G., et al., "Context-Aware Retrieval for Ubiquitous Computing Environments," Mobile and Ubiquitous Information Access, Lecture Notes in Computer Science, Jan. 27, 2004, pp. 227-243, vol. 2954.

Shedherd, M., et al., "Browsing and Keyword-Based Profiles: a Cautionary Tale," Proceedings of the 34$^{th}$ Hawaii International Conference on System Sciences, Jan. 3-6, 2001, pp. 1365-1373.

White, R., et al., "The Use of Implicit Evidence for Relevance Feedback in Web Retrieval," Lecture Notes in Computer Science, Jan. 1, 2002, pp. 93-109, vol. 2291.

U.S. Appl. No. 10/749,440, filed Dec. 31, 2003, Badros et al.

80-20 Software—Products—80-20 One Search, http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," JavaScript Cookbook, 1$^{st}$ Ed., Oct. 1999, O'Reilly™ Online Catalog, http://www.oreilly.com/catalog/iscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-techonologies.com/products/devonthink.php, printed Mar. 16, 2004.

dtSearch® —http://www.dtsearch.com/, printed Mar. 15, 2004.

Dumais, S., et al, "Stuff I've Seen: A System for Personal Information Retrieval and Re-Use," Microsoft Research, SIGIR'03, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: an Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: a Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: a Tour Guide for the World Wide Web," 1998.

Markoff, J., "Google Moves Toward Clash with Microsoft," The New York Times, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," The Proceedings of the International Conference on Intelligent User Interfaces (IUI'00), Jan. 9-12, 2000.

Rhodes, B., et al., "Just-in-time information retrieval agents," Systems Journal, vol. 39, Nos. 3&4, 2000, pp. 685-704.

Rhodes, B., et al., "Remembrance Agent—a continuously running automated information retrieval system," the Proceedings of the First International Conference on the Practical Application of Intelligent Agents and Multi Agent Technology (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," The Search Engine Report, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

* cited by examiner

METHODS AND SYSTEMS FOR PERFORMING AN OFFLINE SEARCH

FIELD OF THE INVENTION

The invention generally relates to search engines. More particularly, the invention relates to methods and systems for performing an offline search for an article.

BACKGROUND OF THE INVENTION

Conventional search applications operating in a networked computer environment such as the World Wide Web and client-device search applications operating in an individual computer can provide search results in response to entry of a user's search query. In many instances, the search results are ranked in accordance with the search application's scoring or ranking system or method. For example, conventional search applications score or rank articles of a search result for a particular query by the number of times a keyword or particular word or phrase appears in each article in the search results.

Users generate and access a large number of articles, such as e-mails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

If a search application returns more than one search result in response to a search query, the search results may be displayed as a list of article identifiers associated with the search results. An article identifier may be, for example, a Uniform Resource Locator (URL), a file name, a link, an icon, a path for a local file, or anything else that identifies an article. A user may browse and visit a web page associated with one or more of the search results to evaluate whether the web page is relevant to the user's search query. For example, a user may manipulate a mouse or another input device and "click" on an article identifier to view a web page associated with the search result. In many instances, the user will browse and visit several web pages provided in the search result, clicking on article identifiers associated with each of the several web pages to access various web pages associated with the search results before locating useful or relevant information to address the user's search query.

Typically, search results for a particular search query on a network search engine are from online data sources accessible via a network such as the Internet. If a particular user does not have access to a network such as the Internet, i.e. the user is working offline, obtaining search results may be limited to previously cached web pages stored by an Internet browser program. To obtain broader search results from the network, the user would have to wait to access the network, i.e. go online, and initiate the search query so that online data sources can be accessed via the network. Obtaining search results in the above manner can be time consuming and cumbersome since the user has to wait to access a network, which may not always be practical.

Users may generate and access a large number of articles, such as e-mails, web pages, word processing documents, spreadsheet documents, instant messenger messages, and presentation documents, using a client device, such as a personal computer, personal digital assistant, or mobile phone. Some articles are stored on a storage device associated with the client device. Users sometimes wish to search the storage device for articles. Some conventional client-device search applications can be slow to process search results including articles stored on a client-side device.

SUMMARY OF THE INVENTION

Embodiments of the present invention comprise methods and systems for performing an offline search for an article. In accordance with one aspect of the invention, a method includes receiving a search query, determining whether the search query has been previously entered, if the search query has been previously entered, retrieving a previously stored result set, determining whether at least a portion of the previously stored result set meets at least one condition, and if the portion of the previously stored result set meets the at least one condition, outputting the previously stored result set.

In accordance with another aspect of the invention, a method includes receiving a search query, determining whether the search query has been previously entered, if the search query has not been previously entered, receiving a result set, storing the result set and associated search query in an offline-accessible data store, and indexing the result set and associated search query for subsequent retrieval of the result set.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
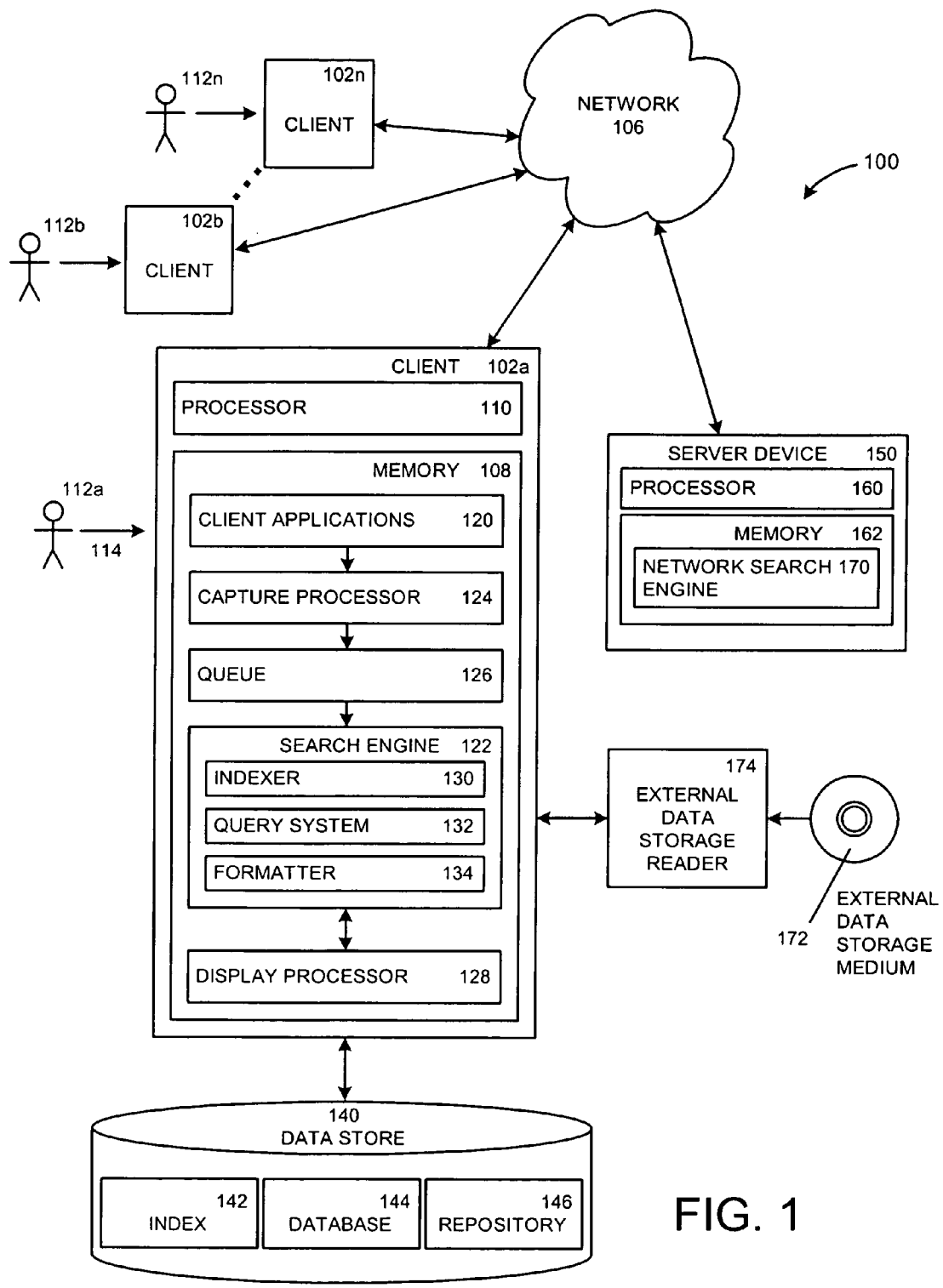
FIG. 1 illustrates a block diagram of a system in accordance with one embodiment of the present invention.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102*a-n* that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102*a-n* shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processors, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a shown can comprise a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, e-mails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an e-mail or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine 122 receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or conversion facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and extracting event data associated with an event. Examples of events include sending or receiving an e-mail message, a user viewing a web page, saving a word processing document, printing a spreadsheet document, inputting text to compose or edit an e-mail, opening a presentation application, closing an instant messenger application, entering a keystroke, moving the mouse, and hovering the mouse over a hyperlink. An example of event data captured by the capture processor 124 for an event involving viewing of a web page by a user can comprise the URL of the web page, the time and date the user viewed the web page, the content of the web page in original or processed forms, a screenshot of the page as displayed to the user, a thumbnail version of the screenshot, and image data associated with the web page. An example of event data captured by the capture processor 124 for an event involving the receipt of an e-mail message by the user 112*a* can comprise the sender of the message, the recipients of the message, the time and date the message was received, the content of the message, and a conversation ID. A conversation ID can be used to associate messages that form a conversation and can be provided by the instant messenger application or can be generated by the capture processor 124. A conversation can be one or more messages between the user 112*a* and at least one other user until the user 112*a* logs out of or closes the instant messenger application or the instant messenger application is inactive for a certain period of time (for example, 30 minutes). Another example of event data captured by the capture processor 124 for an event involving the viewing of a web page by a user can comprise the URL of the web page, the time and date the user viewed the web page, the content of the web page in original or processed forms, a screenshot of the page as displayed to the user, and a thumbnail version of the screenshot.

In the embodiment shown, the capture processor 124 comprises multiple capture components. For example, the capture processor 124 shown in FIG. 1 comprises a separate capture component for each client application in order to capture events associated with each application. The capture processor 124 shown also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102*a*. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger event sent by a user 112*a* can include a recipient or list of recipients, the time sent, the date sent, content of the message, and a conversation ID. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. An event schema can also contain lists of information, such as, for example, multiple recipient fields from an e-mail. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable." In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or e-mail. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an e-e-e-mail or pasting a sentence in a word processing document, closing an article, such as closing an instant messenger window or changing an email message being viewed, loading, saving, opening, or viewing an article, such as a word processing document, web page, or e-mail, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, spreadsheet documents, the e-mails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an e-mail application, to retrieve articles and other associated information. For example, the capture processor 124 can request that the web browser application obtain all viewed web pages by the user or request that the e-mail application obtain all e-mail messages associated with the user. These articles may not currently exist in memory 108 or on a storage device of the client device 102*a*. For example, the e-mail application may have to retrieve e-mails from a server device. In one embodiment, the search engine 122 indexes historical events.

In the embodiment shown in FIG. 1, events captured by the capture processor 124 are sent to the queue 126 in the form of an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126, or how detailed the events are that are sent (fewer or smaller events when the system is busy), or how frequently events are sent (events are sent less often when the system is busy or there are too many events waiting to be processed). The search engine 122 can use performance data to determine when it indexes various events and when and how often it issues implicit queries.

In one embodiment, the queue 126 holds the events and performance data until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a two- or three-priority queue where higher priority events are served before lower priority events, and other components may be able to specify the type of events they are interested in. Generally, real-time events can be given higher priority than historical events, and indexable events can be given higher priority than non-indexable real time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 shown contains an indexer 130, a query system 132, and a formatter 134. The query system 132 can retrieve all real-time events and performance data from the queue 126. The query system 132 can use performance data and real-time events to update the current user state and generate an implicit query. The query system 132 can also receive and process explicit queries from the user 112a. Performance data can also be retrieved by the search engine 122 from the queue 126 for use in determining the amount of activity possible by the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown, the data store comprises an index 142, a database 144 and a repository 146.

In one embodiment, when the indexer 130 receives an event, the indexer 130 can determine, from the event, terms (if any) associated with the event, location information associated with the event (if available), the time of the event (if available), images (if any) associated with the event, and/or any other information defining the event. The indexer 130 can also determine if the event relates to other events and associate the event with related events. For example, for a received instant messenger message event, the indexer can associate the message event with other message events from the same conversation. The messages from the same conversation can be associated with each other in a conversation object, which can be stored in the data store 140.

The indexer 130 can send and incorporate the terms, locations, and times, associated with the event in the index 142 of the data store 140. The event can be sent to the database 144 for storage and the content of the associated article and any associated images can be stored in the repository 146. The conversation object associated with e-mail messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's e-mails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128.

In one embodiment, the formatter 134 formats the results in XML, HTML, or tab delineated text. The display processor

128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including, for example, DLL exports, COM interface, VB, JAVA, or NET libraries, or a web service.

In the embodiment shown in FIG. 1, the query system 132 can compare a search query such as an explicit query entered into a search engine interface to an indexed list of one or more previously stored search queries in the data store 140 or index 142. If the search query matches a previously stored search query, a corresponding article or result set can be retrieved from the data store 140, database 144, repository 146, external data storage medium 172, external data storage reader 174, or other data storage device. If the search query does not match a previously stored search query, the search query can then be transmitted to the network 106 for determining a result set for the search query. In this manner, the system 100 limits traffic on the network 106 and saves users 112a-n time in locating an article in response to a previously entered search query.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 shown includes a server executing a search engine application program, such as the Google™ search engine. In other embodiments, the server device 150 can comprise a related information server or an advertising server. Similar to the client devices 102a-n, the server device 150 shown can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide the result set to the client device 102a via the network 106. The result set can comprise one or more article identifiers. An article identifier may be, for example, a Uniform Resource Locator (URL), a file name, a link, an icon, a path for a local file, a time, a date, an expiration date, or anything else that identifies an article. In the embodiment shown, an article identifier comprises a URL associated with an article.

In one embodiment, the server device 150, or related device, has previously performed a crawl of the network 106 to locate articles, such as web pages, stored at other devices or systems connected to the network 106, and indexed the articles in memory 162 or on another data storage device.

Furthermore, in the embodiment shown in FIG. 1, articles can also be indexed in another data storage device. Articles can be indexed in an external data storage medium 172 such as a DVD or compact disc for transmission by mail delivery or other means to a user 112a-n. Articles indexed on the external data storage medium 172 can then be accessed by a client 102a-n using an external data storage reader 174 such as a DVD or compact disc drive. In this manner, the system 100 limits traffic on the network 106 and saves users 112a-n time in locating an article in response to a previously entered search query.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIGS. 2 through 4.

Various methods in accordance with embodiments of the present invention may be carried out. For example, in one embodiment a search engine receives a search query from a user, determines whether the search query has been previously entered by the user, if the search query has been previously entered, retrieves a previously stored result set, determines whether at least a portion of the previously stored result set meets at least one condition, and if the at least a portion of the previously stored result set meets the at least one condition, outputting the previously stored result set.

In another embodiment, the search engine receives a search query, determines whether the search query has been previously entered, if the search query has not been previously entered, receives a result set, stores the result set and associated search query in an offline-accessible data store, and indexes the result set for subsequent retrieval of the result set.

In another embodiment, the search engine receives a request for an article in a result set from a client device, the article accessible via a network, determines whether the article is stored in an offline-accessible data store associated with the client device, and if the article is stored in an offline-accessible data store, determining whether the article meets at least one condition, if the article meets at least one condition, retrieving the article from the offline-accessible data store, if the article does not meet at least one condition, retrieving the article via the network, if the article is not stored in an offline-accessible data store, retrieving the article via the network, and outputting the article on the client device.

In another embodiment, the search engine receives a search query, determines whether the search query has been previously entered, if the search query has not been previously entered, receives a result set, stores the result set in an offline-accessible data store; and indexes the result set for subsequent retrieval, and if the search query has been previously entered, determines whether a previously stored result set meets at least one condition. If the result set meets at least one condition, the search engine outputs the previously stored result set; and if the result set does not meet at least one condition, the search engine receives a result set, stores the result set in an offline-accessible data store, and indexes the result set for subsequent retrieval.

Figure 2:
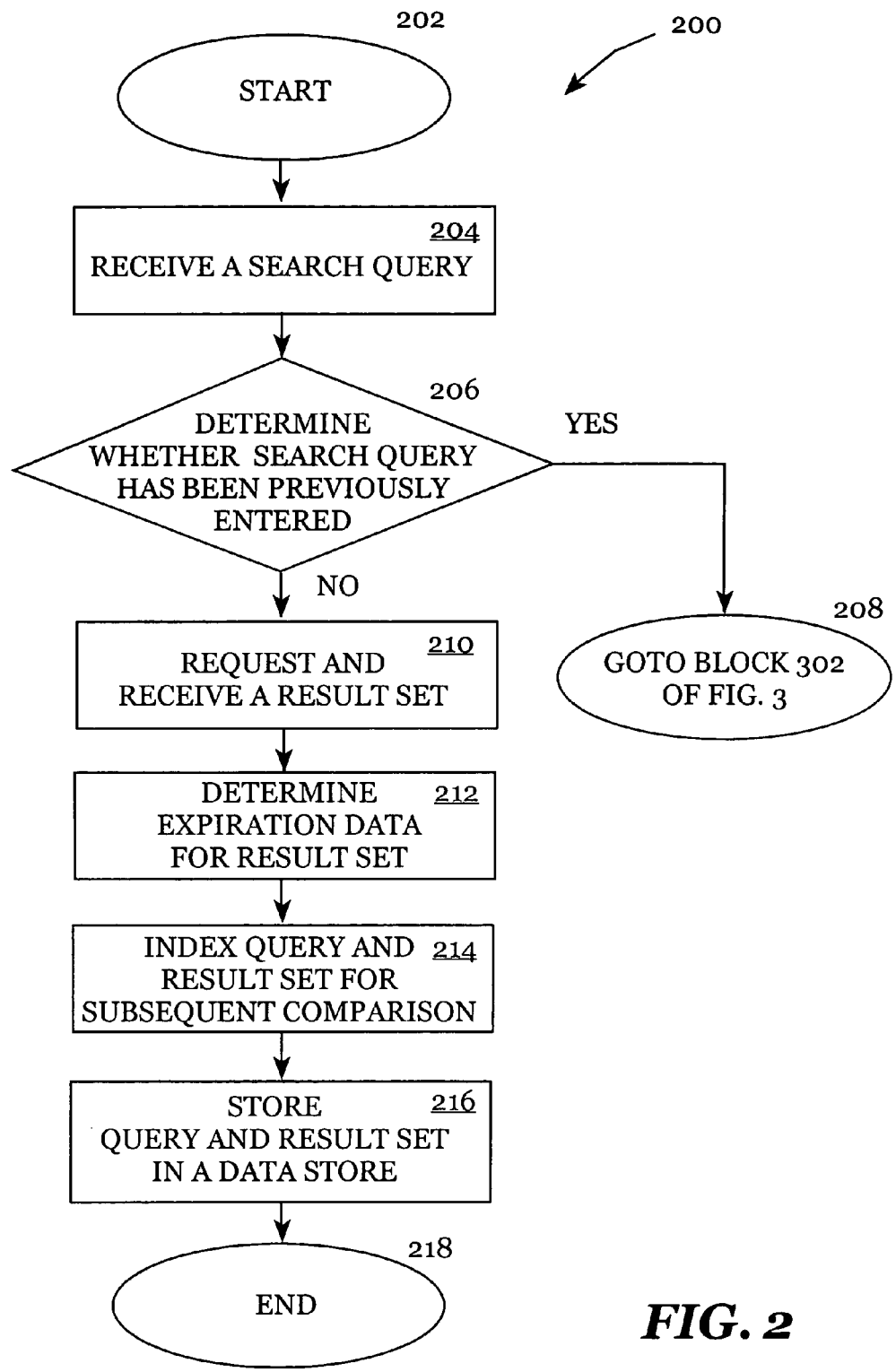
FIG. 2 illustrates a flow diagram of a method in accordance with one embodiment of the present invention.

FIG. 2 illustrates an exemplary method 200 that provides a method for performing an offline search for an article. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In block 202, the method 200 begins. Block 202 is followed by block 204, in which a search query is received. In the example shown, a user 112a enters a search query into a search engine interface, and the query system 132 receives the search query.

Block 204 is followed by decision block 206, in which a determination is made whether the search query has been previously entered by the user. In the embodiment shown, the query system 132 compares the search query to an indexed list of search queries stored in the data store 140, index 142, or another data storage device. Note that the indexed list of search queries is a list of previously stored search queries that have been previously entered by the user. If the present search query matches a previously stored search query in the indexed list of search queries, then the "YES" branch is followed to block 208.

Block 208 goes to block 302 of FIG. 3, which is discussed in greater detail below.

Returning to decision block 206, if the present search query does not match a previously stored search query in the indexed list of search queries, then the "NO" branch is followed to block 210.

In block 210, a result set is requested and received. This may be accomplished by, for example, retrieving, accessing, or otherwise obtaining an article and associated article data via a network 106 such as the Internet, from a client device 102a, from an external data storage medium 172, or from an external data storage reader 174. As described with reference to FIG. 1, the query system 132 can locate relevant information in the data store 140 and provide a result set in response to a search query.

In one embodiment, the result set comprises article identifiers for articles associated with the client applications 120 or client articles. In yet another example, a search engine 122 or a network search engine 170 receives article data associated with articles in a result set as a response to an explicit search query such as relevant information previously stored in a data store 140, database 144, memory 108, network 106, server 150, external data storage medium 172, external data storage reader 174, or a client 102a-n. In each of these instances, the query system 132 provides a result set that includes one or more articles and/or article identifiers, in response to a search query that has not been previously entered by the user 112a-n.

In one embodiment, a user 112a-n can perform an offline search. That is, the user 112a can operate the client 102a while the network 106 is not accessible by the client 102a. In this instance, a result set can comprise articles, such as web pages that the user has accessed before, and articles stored on a DVD such as popular web pages. In this manner, the client 102a, via the query system 132, can receive a result set from the external data storage medium 172 while the user 112a is offline.

Block 210 is followed by block 212, in which expiration data for the result set can be determined. Note that this feature is optional. For the instances described in block 210, query system 132 can determine expiration data based in part on article data, such as determining an expiration time based on a preset amount of time from the time that the article of interest was received or accessed, or based on a preset amount of time from the time of a specific event or change associated with the article of interest. The expiration data is then stored as article data associated with the respective article. In some instances, expiration data can be determined for the result set rather than an individual article. Likewise, the query system 132 determined expiration data based in part on article data such as the date and/or time a result set was generated, stored, or otherwise collected.

For example, the query system 132 can determine expiration data for an article, such as an expiration date for a web page. The expiration data is based on a preset time from a time and/or date associated with the web page. If for example, the web page was indexed at a time and date designated as "02:00:00" and "11-Feb-04," respectively, the capture processor 124 can determine that the web page "expires" at a preset time such as 48 hours after that time, or at "02:00:00" and "13-Feb-04." Note that other preset times can be used in accordance with various embodiments of the invention. Furthermore, note that other times or dates associated with an article can be used in accordance with various embodiments of the invention.

Block 212 is followed by block 214, in which the search query and result set are indexed for subsequent comparison. For example, when a search query is processed as described in blocks 204-206, the search query is stored by the query system 132 in the data store 140, index 142, or other data storage device. The stored search query is also referenced against any result sets received and stored as described in blocks 210-212. Note that the result sets can comprise the expiration time for a particular article, cache of articles, or result set for a particular search query.

In some instances, a search query and result set can be indexed or otherwise organized into one or more unique categories depending on the types of articles comprising the query, result set, both the search query and result set, or the types of data sources that the articles comprising the result set were received from or otherwise obtained from. For example, as described above with respect to block 210, the query system 132 could receive a result set comprising articles such as web pages for a particular search query. The indexer 130 could also receive a result set comprising articles such as documents or emails from a client-side device for the particular search query. In this example, at least three categories of articles could exist for a result set, web pages, documents, and emails. Other types of articles in similar or other categories could be received by the indexer 130. Each category of articles could be then be monitored, updated, and indexed by the indexer 130 and query system 132 as needed.

Block 214 is followed by block 216, in which the search query and result set are stored in a data store. In the example shown, the query system 132 stores the result set and the associated search query in a data store such as data store 140, database 144, memory 108, network 106, server 150, external data storage medium 172, external data storage reader 174, or a client 102a-n. The result set stored in a data store is also known as a "cache" of articles and/or article identifiers. Note that the result set can comprise articles, article identifiers, article data, web pages, documents, and/or emails. An offline-accessible data store can be, but is not limited to, a data store 140, database 144, memory 108, network 106, server 150, external data storage medium 172, external data storage reader 174, a client 102a-n, any data storage device on the client-side, or any data storage device that can be accessed by a client while offline from a network.

Block 216 is followed by block 218, in which the method 200 ends.

Figure 3:
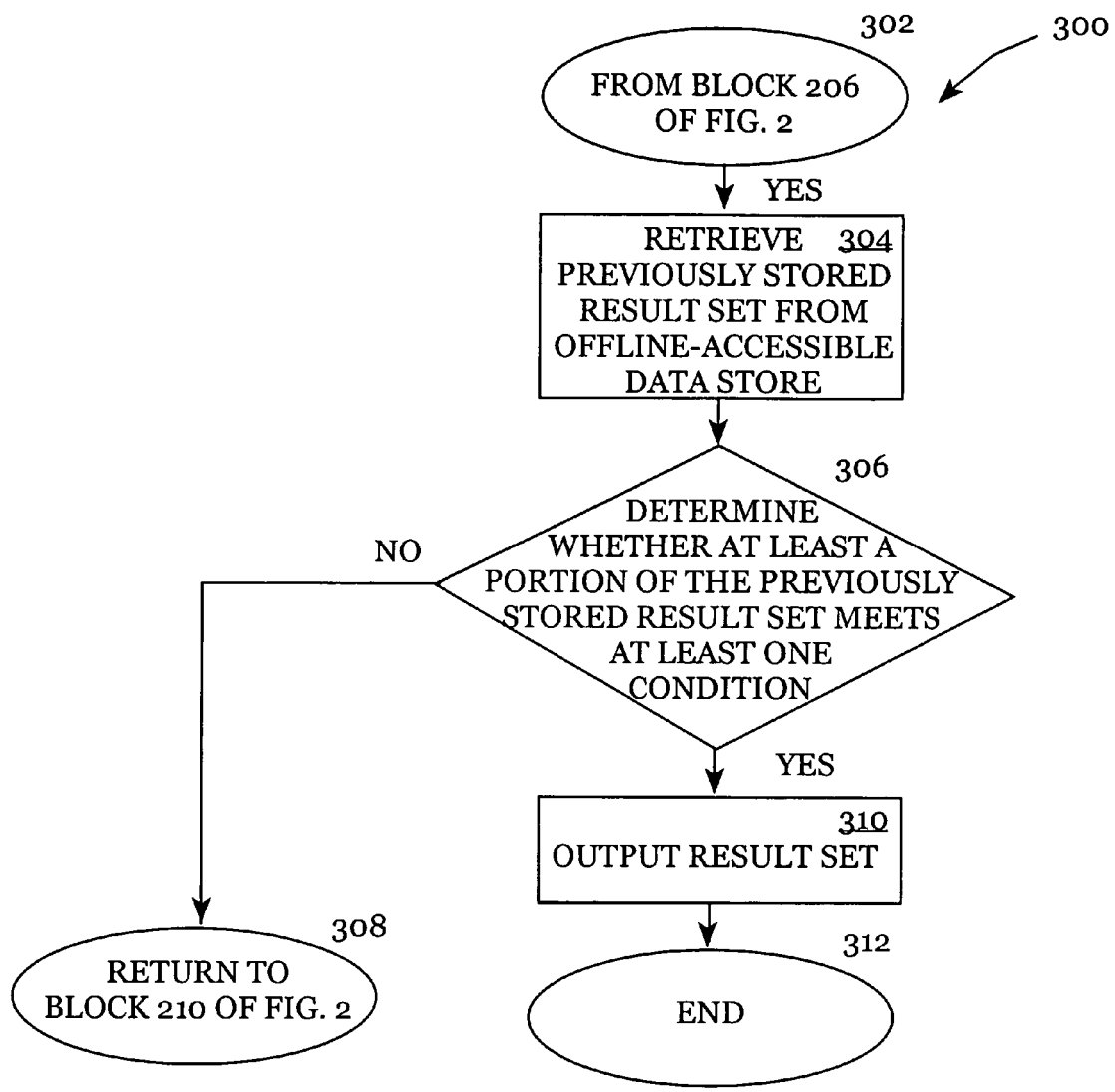
FIG. 3 illustrates a flow diagram of a subroutine of the method shown in FIG. 2.

FIG. 3 illustrates an example of a subroutine 300 for performing an offline search for an article. The subroutine 300 shown determines an article for a search query that has been previously entered into a search engine. In the embodiment shown, the order of processing the various data can be interchanged. In other embodiments, the order of processing can be predetermined or can be interchangeable depending upon the article data processed. An example of subroutine 300 is as follows.

Referring to FIG. 3, the example subroutine 300 begins at block 302. At block 302, the query system 132 determines that a search query has been previously entered as described by decision block 206 in FIG. 2. In the embodiment shown, the query system 132 compares the search query to an indexed list of search queries stored in the data store 140, index 142, or another data storage device. Note that the indexed list of search queries is a list of previously stored search queries that have been previously entered by the user.

Block 302 is followed by block 304, in which a previously stored result set is retrieved from an offline-accessible data store. In the example shown, the query system 132 determines that the search query has been previously entered. The query system 132 calls to the data store 140, index 142, database 144, repository 146, external data storage reader 174, external data storage medium 172, or other data storage device to retrieve a result set for the previously entered search query.

Block 304 is followed by decision block 306, in which a determination is made whether at least a portion of the result set meets at least one condition. In the example shown, the query system 132 determines whether at least a portion of the result set for the previously entered search query meets at least one condition indicating the portion of the result set is a valid search result set for the present search query. This permits the query system 132 to identify a time when the result set, a cache of articles, category of articles, or an individual article may no longer meet at least one condition indicating that the portion of the result set is a valid search result for the particular previously stored search query. Therefore, if the query system 132 determines that a previously stored result set meets at least one condition, then the "YES" branch is followed to block 310.

In other embodiments, a condition can be based at least on some or all of the following: validity of a portion of the result set, a portion of the result set is new, a portion of the result set includes a change, a new article exists in a category of the result set, a new article has been received in a category of the result set, an article has been changed in the result set, a new e-mail has been received in a category of the result set, a new e-mail has been sent in a category of the result set, a new web page has been received in a category of the result set, a web page has been changed in a category of the result set, a new document has been received in a category of the result set, and a new document has been generated in a category of the result set.

In one embodiment, the query system 132 determines whether at least a portion of a particular result set meets at least one condition based on the recency of the articles in the result set. For example, if the result set includes an article such as a web page, then the time and date that the web page was last updated can be used to determine an expiration date for the article. Using a preset amount of time, such as 48 hours, the preset amount of time can be added to the time and date that the web page was last updated, and the query system 132 can determine if the current date and time exceeds the preset amount of time. Alternatively, the query system 132 could use a single time and date for a category or cache of articles to determine an expiration date for the cache or category of articles. Likewise, using a preset amount of time, such as 48 hours, the preset amount of time can be added to the time and date the category or cache of articles was stored, and the query system 132 can determine if the current date and time exceeds the preset amount of time. In this manner, the query system 132 can identify a time when a particular result set, article or article identifier, or category or cache of articles does not meet at least one condition indicating that the portion of the result set is a valid search result for a particular previously stored search query. In other embodiments, other durations of time can be used for a preset time in determining whether at least one condition is met for a particular an article, article identifier, category, cache, or result set.

In yet another embodiment, the query system 132 determines whether at least a portion of a particular result set meets at least one condition indicating that the portion of the result set is "valid," such as a subset of the result set. Since a result set can include multiple search results, validation of each particular result can be made. For example, if a result set contains fifty articles such as fifty web pages, and only a subset of the web pages, thirty web pages, are determined to meet a condition indicating the portion of the result set to be "valid," then the subset of "valid" search results can be returned in response to the search query. In this example, the other twenty web pages are considered "expired" search results. In this manner, the speed of processing a result set can be increased since ranking and/or displaying a layout of "valid" search results does not need to be re-processed.

In yet another embodiment, providing "expired" search results can be utilized. For example, if a user 112a-n cannot access the network 106 and is performing an offline search, a result set can be provided even though the user 112a-n cannot access the network 106. In this example, a result set can be provided with "expired" search results that are flagged or otherwise marked for the user to identify as expired results.

In another embodiment, the query system 132 monitors the result set and determines whether a "change" with respect to the result set has occurred. A "change" can be the presence of a "new" article that was not included in the initial search that provided the result set in response to a previously entered search query, the detection of additions or edits to a document, the detection of a newly updated web page, or the determination that a web page or article has expired based on a preset amount of time. A "new" article (or article identifier) is an article (or article identifier) that was not present in a preceding result set for a particular search query.

In another embodiment, the query system 132 can determine whether a "change" has occurred with respect to a particular category of articles or article identifiers within the result set. For example, as described above, a result set can be organized into categories such as web pages, documents, and e-mails. If the query system 132 previously stored 10 e-mails in the email category for a particular result set, the query system 132 can determine that the e-mail category is no longer a "valid" search result for a particular search query if new e-mails have been received since the original 10 e-mails were stored for the particular search query. The presence of the new e-mails is a "change" that would invalidate the category of e-mails in the search result since the new e-mails were not included in the initial search using the original search query, and the new e-mails could be relevant articles for the present search query. The determination of new articles or article identifiers in a particular category of a result set for a previously stored search query is an example of a "change" as used herein.

A changes can include, but is not limited to, determining that a new article exists in a category of the result set, determining that a new article has been received in a category of the result set, determining that an article has been changed in the result set, determining that a new e-mail has been received in a category of the result set, determining that a new e-mail has been sent in a category of the result set, determining that a new web page has been received in a category of the result set, determining that a web page has been changed in a category of the result set, determining that a new document has been received in a category of the result set, and determining that a new document has been generated in a category of the result set. Other examples of a change exist.

In some embodiments, a "change" for a particular category of articles or article identifiers in a result set may not represent a "change" that affects a condition such as the validity of articles or article identifiers in other categories of the particular result set. The presence of new e-mails would be a "change" affecting a condition such as validity of the e-mail category for the particular result set. In this example, previously stored articles and article identifiers in the other categories, such as web pages and documents, could still be valid in the result set for the previously stored search query. In these instances, the respective "YES" and "NO" branches from decision block 306 would be followed for each particular category of articles or article identifiers of the result set depending on whether a "change" was determined to occur for the respective category of articles or article identifiers of the result set.

In other instances, if the query system 132 determines at least a portion of the previously stored result set does not meet at least one condition such as the portion of the result set is valid, then the "NO" branch is followed to block 308. In block 308, the subroutine 300 returns to block 210 of FIG. 2, where a new result set is provided, and the method 200 continues.

In block 310, the portion of the previously stored result set is output, such as displaying on a display device associated with the client device. The query system 132 calls to the display processor 128 to output the validated result set from the offline data store. The display processor 128 utilizes an associated display interface for a user 112a-n to view the result set. In this manner, offline search results for a previously stored search query can be returned to the user 112a-n, thus limiting traffic on the network 106 and saving users 112a-n time in locating articles in response to previously entered search queries.

Block 312 follows block 310, the subroutine 300 ends.

Figure 4:
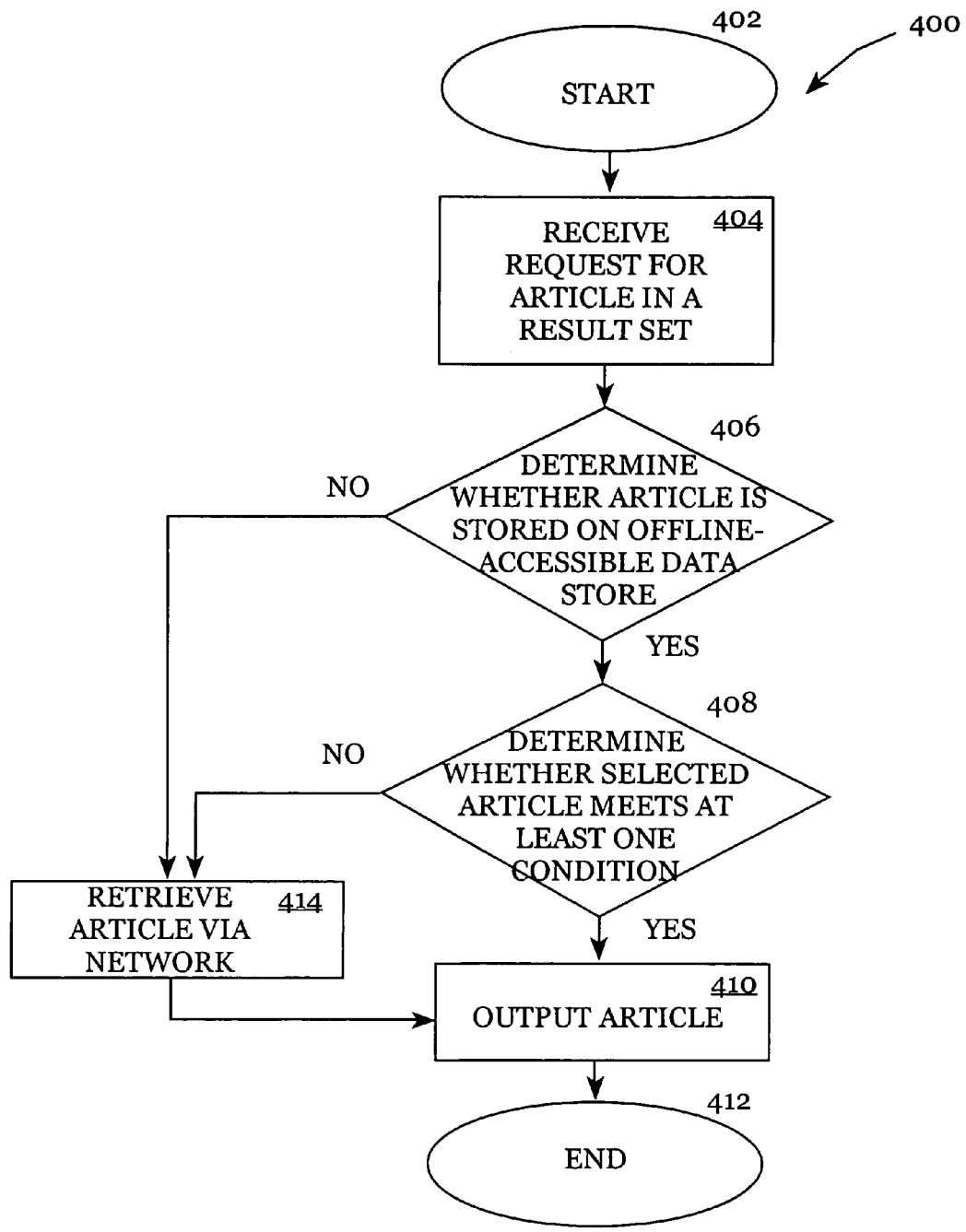
FIG. 4 illustrates a flow diagram of another method in accordance with one embodiment of the present invention.

FIG. 4 illustrates an exemplary method 400 that provides a method for performing an offline search for an article. This exemplary method is provided by way of example, as there are a variety of ways to carry out methods according to the present invention. The method 400 shown in FIG. 4 can be executed or otherwise performed by any of various systems. The method 400 is described below as carried out by the system 100 shown in FIG. 1 by way of example, and various elements of the system 100 are referenced in explaining the example method of FIG. 4.

In block 402, the method 400 begins. Block 402 is followed by block 404, in which a request for an article in a result set is received. In the example shown in FIG. 4, a user 112a-n selects an article identifier in a result set for a particular search query. Note that in some instances, the article identifier corresponds to an article accessible via the network 106. The query system 132 receives the user selection or request for the article or article identifier.

In one embodiment, the user 112a is working offline, and selects an article or article identifier in a result set for a particular search query. The particular article or article identifier can correspond to a previously stored article in an offline-accessible data store. The query system 132 receives the user's request or selection of the article or article identifier.

Block 404 is followed by decision block 406, in which a determination is made whether the selected article is stored in an offline-accessible data store. In the embodiment shown, the query system 132 compares the selected article or article identifier to an indexed list of articles and article identifiers stored in the data store 140, index 142, database 144, repository 146, or another data storage device. Note that the indexed list of articles and article identifiers is a list of previously stored articles and article identifiers that have been previously stored. If the selected article or article identifier matches a previously stored article or article identifier in the indexed list, then the "YES" branch is followed to decision block 408.

At decision block 408, a determination is made whether the selected article meets at least one condition. In the example shown, the query system 132 determines whether the selected article meets at least one condition such as whether the selected article is a valid article. Similar to conditions described above such as validation features described in decision block 306, this permits the query system 132 to identify a time when the article, result set, a cache of articles, or category of articles may no longer meet at least one condition indicative of a valid search result. Therefore, if the query system 132 determines that a previously stored article meets at least one condition, then the "YES" branch is followed to block 410.

In block 410, the article is output. In the embodiment shown, the query system 132 calls to the display processor to output the article or article identifier, such as by displaying the article on a display interface associated with the client device. A user 112a-n can view the selected article which can include, for example, a web page, a document, or an email.

Block 410 is followed by block 412, in which the method 400 ends.

Returning to decision block 406, if a determination is made that the selected article or article identifier does not match a previously stored article or article identifier, then the "NO" branch is followed to block 414.

In block 414, the article is retrieved from a server device via a network. Since the article or article identifier does not match a list of previously stored articles and article identifiers, the selected article is retrieved for the user 112a-n. The query system 132 calls to a server device 150 via the network 106 to retrieve the selected article. The selected article can then be output for display to the user 112a-n.

Block 414 is followed by block 410 as described above, in which the article is output, such as for display to a user 112a-n.

Returning to decision block 408, if the query system 132 determines that a previously stored article does not meet at least one condition, then the "NO" branch is followed to block 414. As described above in block 414, the article is retrieved from a server device on the network, and the selected article can be output for display to the user 112a-n.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method comprising:
   (a) receiving a search query;
   (b) determining whether the search query has been previously received;
   (c) responsive to a determination that the search query has not been previously received,
      (i) receiving a new result set associated with the search query,
      (ii) storing the new result set associated with the search query in an offline-accessible data store, and
      (iii) outputting the new result set as a search result of the search query;
   (d) responsive to a determination that the search query has been previously received,
      (i) retrieving a previously stored result set associated with the search query from the offline-accessible data store, the previously stored result set comprising a plurality of categories each of which comprises one or more articles,
      (ii) determining whether at least one of the plurality of categories of the previously stored result set associated with the search query is a valid search result set for the search query, and
      (iii) responsive to a determination that the at least one of the plurality of categories of the previously stored result set associated with the search query is a valid search result set for the search query, outputting the at least one of the plurality of categories of the previously stored result set associated with the search query as a search result of the search query.

2. The method of claim 1, wherein determining whether a search query has been previously received comprises comparing the search query to a list of previously received search queries.

3. The method of claim 1, wherein determining whether at least one of the plurality of categories of the previously stored result set associated with the search query is a valid search result set for the search query comprises determining at least one of the following: determining that one of the plurality of categories of the result set is new, determining that one of the plurality of categories of the result set includes a change, determining that a new article exists in one of the plurality of categories of the result set, determining that a new article has been received in one of the plurality of categories of the result set, determining that an article in one of the plurality of categories of the result set has been changed, determining that a new e-mail has been received in one of the plurality of categories of the result set, determining that a new e-mail has been sent in one of the plurality of categories of the result set, determining that a new web page has been received in one of the plurality of categories of the result set, determining that a web page has been changed in one of the plurality of categories of the result set, determining that a new document has been received in one of the plurality of categories of the result set, and determining that a new document has been generated in one of the plurality of categories of the result set.

4. The method of claim 1, wherein determining whether at least one of the plurality of categories of the previously stored result set associated with the search query is a valid search result set for the search query comprises determining whether a preset amount of time has elapsed from a time associated with the result set.

5. The method of claim 1, wherein determining whether at least one of the plurality of categories of the previously stored result set associated with the search query is a valid search result set for the search query comprises determining whether a preset amount of time has elapsed from a date associated with the result set.

6. The method of claim 1, wherein retrieving a previously stored result set associated with the search query comprises at least one of the following: retrieving the result set from an optical disc, retrieving the result set from a hard drive, retrieving the result set from an external data storage medium, retrieving the result set from an external data storage reader, and retrieving the result set from a data store on the client-side.

7. The method of claim 1, wherein receiving a search query comprises at least one of the following: receiving the search query from a user operating an offline client-side device, receiving the search query from a user operating an online client-side device.

8. The method of claim 1, wherein the previously stored result set associated with the search query comprises at least one of the following: client-side articles, and network articles.

9. The method of claim 1, wherein the search query comprises at least one of the following: an implicit query, an explicit query, both an implicit query and an explicit query.

10. The method of claim 1, wherein the previously stored result set associated with the search query comprises at least one of the following: a real-time event, a historical event, an indexable event, a non-indexable event.

11. The method of claim 1, wherein each category of the plurality of categories is associated with an article type and contains only articles of that article type, and determining whether at least one of the plurality of categories of the previously stored result set associated with the search query is a valid search result set for the search query further comprises:
   determining whether an article in one of the plurality of categories has been modified after the previously stored result set was stored in the offline-accessible data store;
   determining whether a new article of an article type associated with the one of the plurality of categories has come into existence after the previously stored result set was stored in the offline-accessible data store; and
   responsive to (1) a determination that the article in the one of the plurality of categories has been modified after the previously stored result set was stored in the offline-accessible data store, or (2) a determination that the new article of the article type associated with the one of the plurality of categories has come into existence after the previously stored result set was stored in the offline-accessible data store, determining that the one of the plurality of categories of the previously stored result set associated with the search query is not a valid search result set for the search query.

12. The method of claim 1, wherein (c) further comprises:
   (iv) determining expiration data for the new result set.

13. The method of claim 12, wherein determining expiration data for the new result set comprises determining expiration data for at least one of the plurality of categories of the new result set, and displaying the expiration data for the at least one of the plurality of categories of the new result set.

14. The method of claim 1, wherein outputting the at least one of the plurality of categories of the previously stored result set associated with the search query as a search result of the search query comprises: outputting a second category of the plurality of categories, the second category being determined and flagged expired.

15. The method of claim 1, wherein storing the new result set and the search query in the offline-accessible data store comprises at least one of the following: storing the new result set on an optical disc, storing the new result set on a hard drive, storing the new result set on an external data storage medium, storing the new result set on an external data storage reader, and storing the new result set on a data store on the client-side.

16. The method of claim 1, further comprising:
(e) receiving a request for an article, the article being accessible via a network;
(f) determining whether the article is stored in an offline-accessible data store; and
(g) if the article is stored in the offline-accessible data store, determining whether the article is valid;
(h) if the article is determined to be valid, retrieving the article from the offline-accessible data store;
(i) if the article is determined not to be valid, retrieving the article via the network;
(j) if the article is not stored in the offline-accessible data store, retrieving the article via the network; and
(k) outputting the article.

17. A computer-readable storage medium containing program code, comprising:
(a) program code for receiving a search query;
(b) program code for determining whether the search query has been previously received;
(c) program code for if the search query has not been previously received,
  (i) receiving a new result set associated with the search query,
  (ii) storing the new result set associated with the search query in an offline-accessible data store, and
  (iii) outputting the new result set as a search result of the search query;
(d) program code for if the search query has been previously received,
  (i) retrieving a previously stored result set associated with the search query from the offline-accessible data store, the previously stored result set comprising a plurality of categories each of which comprises one or more articles,
  (ii) determining whether at least one of the plurality of categories of the previously stored result set associated with the search query is a valid search result set for the search query, and
  (iii) responsive to a determination that the at least one of the plurality of categories of the previously stored result set associated with the search query is a valid search result set for the search query, outputting the at least one of the plurality of categories of the previously stored result set associated with the search query as a search result of the search query.

18. The computer-readable storage medium of claim 17, wherein the program code for determining whether the search query has been previously received comprises program code for comparing the search query to a list of previously received search queries.

19. The computer-readable storage medium of claim 17, wherein the program code for determining whether at least one of the plurality of categories of the previously stored result set associated with the search query is a valid search result set for the search query comprises program code for determining at least one of the following: determining that one of the plurality of categories of the result set is new, determining that one of the plurality of categories of the result set includes a change, determining that a new article exists in one of the plurality of categories of the result set, determining that a new article has been received in one of the plurality of categories of the result set, determining that an article in the result set has been changed, determining that a new e-mail has been received in one of the plurality of categories of the result set, determining that a new e-mail has been sent in one of the plurality of categories of the result set, determining that a new web page has been received in one of the plurality of categories of the result set, determining that a web page has been changed in one of the plurality of categories of the result set, determining that a new document has been received in one of the plurality of categories of the result set, and determining that a new document has been generated in one of the plurality of categories of the result set.

20. The computer-readable storage medium of claim 17, wherein the program code for determining whether at least one of the plurality of categories of the previously stored result set associated with the search query is a valid search result set for the search query comprises program code for determining whether a preset amount of time has elapsed from a time associated with the result set.

21. The computer-readable storage medium of claim 17, wherein the program code for determining whether at least one of the plurality of categories of the previously stored result set associated with the search query is a valid search result set for the search query comprises program code for determining whether a preset amount of time has elapsed from a date associated with the result set.

22. The computer-readable storage medium of claim 17, wherein the program code for retrieving a previously stored result set associated with the search query comprises at least one of the following: program code for retrieving the result set from an optical disc, program code for retrieving the result set from a hard drive, program code for retrieving the result set from an external data storage medium, program code for retrieving the result set from an external data storage reader, and program code for retrieving the result set from a data store on the client-side.

23. The computer-readable storage medium of claim 17, wherein the program code for receiving a search query comprises at least one of the following: program code for receiving the search query from a user operating an offline client-side device, program code for receiving the search query from a user operating an online client-side device.

24. The computer-readable storage medium of claim 17, wherein the previously stored result set comprises at least one of the following: client-side articles, and network articles.

25. The computer-readable storage medium of claim 17, wherein the search query comprises at least one of the following: an implicit query, an explicit query, both an implicit query and an explicit query.

26. The computer-readable storage medium of claim 17, wherein the previously stored result set comprises at least one of the following: a real-time event, a historical event, an indexable event, a non-indexable event.

27. The computer-readable storage medium of claim 17, wherein each category of the plurality of categories is associated with an article type and contains only articles of that article type, and determining whether at least one of the plurality of categories of the previously stored result set associated with the search query is a valid search result set for the search query further comprises:
  determining whether an article in one of the plurality of categories has been modified after the previously stored result set was stored in the offline-accessible data store;
  determining whether a new article of an article type associated with the one of the plurality of categories has come into existence after the previously stored result set was stored in the offline-accessible data store; and responsive to (1) a determination that the article in the one of the plurality of categories has been modified after the previously stored result set was stored in the offline-accessible data store, or (2) a determination that the new article of the article type associated with the one of the plurality of categories has come into existence after the previously stored result set was stored in the offline-accessible data store, determining that the one of the plurality of categories of the previously stored result set associated with the search query is not a valid search result set for the search query.

28. The computer-readable storage medium of claim 17, wherein (c) further comprises:
   (iv) program code for determining expiration data for the new result set.

29. The computer-readable storage medium of claim 28, wherein the program code for determining expiration data for the new result set comprises program code for determining expiration data for at least one of the plurality of categories of the new result set, and program code for displaying the expiration data for the at least one of the plurality of categories of the new result set.

30. The computer-readable storage medium of claim 17, wherein the program code for determining whether the search query has been previously received comprises program code for comparing the search query to a list of previously received search queries.

31. The computer-readable storage medium of claim 17, wherein the program code for if the search query has not been previously received, (i) receiving a new result set comprises program code for performing a search for articles in response to the search query.

32. The computer-readable storage medium of claim 17, wherein the program code for storing the new result set and the search query in the offline-accessible data store comprises at least one of the following: program code for storing the new result set on an optical disc, program code for storing the new result set on a hard drive, program code for storing the new result set on an external data storage medium, program code for storing the new result set on an external data storage reader, and program code for storing the new result set on a data store on the client-side.

33. A method comprising:
(a) receiving a search query;
(b) determining whether the search query has been previously received;
(c) if the search query has not been previously received,
   (i) receiving a first result set,
   (ii) storing the first result set in an offline-accessible data store,
   (iii) indexing the first result set for subsequent retrieval, and
(d) if the search query has been previously received,
   (i) retrieving a previously stored result set associated with the search query, the previously stored result set comprising a plurality of categories each of which comprising one or more articles, wherein each category of the plurality of categories is associated with an article type and contains only articles of that article type,
   (ii) determining whether at least one of the plurality of categories of the previously stored result set associated with the search query is a valid search result set for the search query, comprising:
      (1) determining whether an article in one of the plurality of categories has been modified after the previously stored result set was stored in the offline-accessible data store,
      (2) determining whether a new article of an article type associated with the one of the plurality of categories has come into existence after the previously stored result set was stored in the offline-accessible data store, and
      (3) responsive to a determination that the article in the one of the plurality of categories has been modified after the previously stored result set was stored in the offline-accessible data store, or a determination that the new article of the article type associated with the one of the plurality of categories has come into existence after the previously stored result set was stored in the offline-accessible data store, determining that the one of the plurality of categories of the previously stored result set associated with the search query is not a valid search result set for the search query,
   (iii) if the at least one of the plurality of categories of the previously stored result set associated with the search query is determined to be a valid search result set for the search query, outputting the at least one of the plurality of categories of the previously stored result set associated with the search query as a search result of the search query, and
   (iv) if the at least one of the plurality of categories of the previously stored result set associated with the search query is determined not to be a valid search result set for the search query,
      (1) receiving a second result set,
      (2) storing the second result set in the offline-accessible data store, and
      (3) indexing the second result set for subsequent retrieval.

34. The method of claim 33, wherein determining whether a search query has been previously received comprises comparing the search query to a list of previously received search queries.

35. A computer system comprising:
a computer processor for executing computer program instructions;
a computer-readable storage medium having executable computer program instructions tangibly embodied thereon, the executable computer program instructions comprising instructions for:
(a) receiving a search query;
(b) determining whether the search query has been previously received;
(c) responsive to a determination that the search query has not been previously received,
   (i) receiving a new result set associated with the search query,
   (ii) storing the new result set associated with the search query in an offline-accessible data store, and
   (iii) outputting the new result set as a search result of the search query;

(d) responsive to a determination that the search query has been previously received,
   (i) retrieving a previously stored result set associated with the search query from the offline-accessible data store, the previously stored result set comprising a plurality of categories each of which comprises one or more articles,
   (ii) determining whether at least one of the plurality of categories of the previously stored result set associated with the search query is a valid search result set for the search query, and
   (iii) responsive to a determination that the at least one of the plurality of categories of the previously stored result set associated with the search query is a valid search result set for the search query, outputting the at least one of the plurality of categories of the previously stored result set associated with the search query as a search result of the search query.

* * * * *